United States Patent
Uhler et al.

(10) Patent No.: US 7,089,560 B1
(45) Date of Patent: Aug. 8, 2006

(54) ARCHITECTURE FOR BUILDING WEB APPLICATIONS

(75) Inventors: Stephen Uhler, Los Altos, CA (US); Rinaldo DiGiorgio, Easton, CT (US); Colin Stevens, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 647 days.

(21) Appl. No.: 09/624,445

(22) Filed: Jul. 24, 2000

(51) Int. Cl.
*G06F 15/163* (2006.01)

(52) U.S. Cl. .................. 719/311; 709/201; 709/205; 709/217

(58) Field of Classification Search ........ 709/200–253; 719/311–316; 715/501.1
See application file for complete search history.

(56) References Cited

U.S. PATENT DOCUMENTS

| | | | | |
|---|---|---|---|---|
| 5,995,975 A * | 11/1999 | Malcolm | ............... | 707/103 R |
| 6,144,990 A * | 11/2000 | Brandt et al. | ............... | 709/203 |
| 6,233,622 B1 * | 5/2001 | Atsatt et al. | ............... | 709/315 |
| 6,529,936 B1 * | 3/2003 | Mayo et al. | ............... | 709/202 |
| 6,757,900 B1 * | 6/2004 | Burd et al. | ............... | 719/316 |
| 2002/0032783 A1 * | 3/2002 | Tuatini | ............... | 709/229 |
| 2005/0050164 A1 * | 3/2005 | Burd et al. | ............... | 709/217 |

* cited by examiner

*Primary Examiner*—William Thomson
*Assistant Examiner*—Charles Anya
(74) *Attorney, Agent, or Firm*—Osha Liang LLP

(57) ABSTRACT

A method and apparatus for providing a Web application framework is provided. The framework includes four main components which are used in combination to create Web servers of varying complexity depending on the needs of the end use. The framework includes a Server object, a Handler object, a Properties object, and a Request object. A Server object is created with an initial set of properties and calls a Hander object. The Handler object defines how URL requests are processed by the Web server. When a request appears at the server, the Request object obtains and formats the request for subsequent processing. The Handler object works with the Properties object to process the request. Multiple Handler objects may be chained together to create a Web application that can perform many operations without being restricted to traditional server designs.

17 Claims, 5 Drawing Sheets

ARCHITECTURE FOR BUILDING WEB APPLICATIONS

A portion of the disclosure of this patent contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

Not Applicable.

STATEMENT REGARDING FEDERALLY SPONSORSHIP RESEARCH OR DEVELOPMENT

Not Applicable.

BACKGROUND OF THE INVENTION

1. Field of the Invention

The present invention relates to Web applications. More particularly, the present invention relates to creating extensible and scalable Web applications.

2. Description of the Related Art

Web servers and Web applications constitute the single most important component of the network content delivery system we know as "The Web". The first Web Servers started to appear in 1994 on systems running the UNIX™ operating system (OS) or a UNIX-based OS on the Internet. The design of those early systems reflects its UNIX-based heritage. URLs (Uniform Resource Locators) are equivalent to UNIX-based OS file names. Each URL, when requested by a client program, typically a "Web Browser", is mapped to a file of the same name, wrapped in the HTTP (HyperText Transport Protocol) and delivered to the client. In those cases where the content can not be represented as a static file and needs to be dynamically generated, the file representing the URL of the client request specifies the program that is run to generate the content. This capability, known as CGI (Common Gateway Interface) stems from the traditional UNIX-based OS designers' practice of making everything look like a file. Thus each URL represents a file that either contains the content, or contains the program that is used to generate the content.

Over the next five years the Web saw explosive growth, and the architecture of the original Web servers, though simple and elegant, was beginning to strain. Static content was still delivered by mapping URL's into files, but dynamic content was becoming problematic. The notion of programs as files, as well as the mechanisms for launching, managing, and communicating with CGI programs is very specific to a UNIX-based OS, which makes porting Web servers and their corresponding content to a non UNIX-based OS difficult. In addition, as content management techniques required more of the content to be generated dynamically, even if simply to paste together several static files as a single URL, the CGI programs rapidly became the bottle neck. Each dynamic page requires a separate program to be launched and executed by the operating system, only to be terminated each time a request was completed. Additionally, the communication between the Web Server and the CGI program is very limited. Only the URL and its corresponding HTTP envelope information is made available to the CGI program, which can only return content; the ability to pass meta-information back to the server is almost non-existent.

The next state in the evolution of Web servers focused on eliminating the CGI bottle neck, and specifically the program creation and execution step required for each URL requested. Generally, three different approaches have been taken: keeping the basic CGI interface, only making it faster; building Web server specific APIs (Application Programming Interfaces) by requiring the dynamic code generating portions to be bound into the same process as the Web server; or defining language specific APIs whose implementations do not require the overhead implied by the CGI model.

The Fast CGI interface tries to improve the performance of the CGI specification by eliminating the process creation and execution step at every request, yet maintaining backward compatibility wherever possible. The Fast CGI interface, represented by the file that maps from the URL, is created and started once when the Web server starts. Multiple independent URL requests are sent to the same fast CGI process by defining a request packet protocol than can accommodate multiple requests and responses for each Fast CGI process. Fast-CGI has the advantage of preserving a separate execution context for dynamic content generation, while eliminating the bulk of the process creation overhead of traditional CGI programs. Consequently, Fast CGI programs are easily ported to work with many different Web servers.

The second approach to eliminating the CGI bottleneck is to move the dynamic content generation program into the same execution context as the server, by expressing the dynamic content generation in terms of APIs that are specific to a particular Web server. This approach eliminates the process creation and execution overhead of CGI programs entirely, but at the expense of close coupling to a particular Web server. Most major Web servers provide such API definitions. However, dynamic content generation using these APIs is rarely portable to a different server. In addition, by having the dynamic content generation in the same execution context as the server, a bug in a dynamic content generation module can negatively impact the entire Web server, including URL requests that have nothing to do with the bug-containing module.

The third approach used to eliminate the CGI bottleneck is to create a set of language specific APIs that can be logically bound into the execution context of the Web server, yet be defined in a Web server independent way. Servlets are the leading example of this approach. A servlet may be a JAVA™ programming language module that conforms to a defined set of language-specific APIs, which can be (and have been) implemented to provide dynamic content for many different Web servers. Thus servlets combine the advantages of Fast CGI portability to different Web servers—with the close coupling of server specific extensions.

Although all three approaches reduce performance problems associated with the CGI interface, they still fundamentally retain the notion of a one-to-one mapping between URLs and files, where all requests and their corresponding files are completely independent.

As the Web has grown, the notion that every URL request and its associated file is independent of any other request has become a serious architectural roadblock. It is now common for a single Web "form" to be spread over multiple pages (URLs), or for a single user to have unique state associated with a sequence of requests that may span days or even years. Finally, as the sheer volume of content on the Web has mushroomed, it is often no longer appropriate to assume, as is implicit in the CGI one-file-per-URL model, that the content resides on the server machine at all. The software architecture that was designed to deliver individual pages in response to URL requests is now being used to build sophisticated applications, whose content happens to be wrapped in HTTP. Somewhere in the switch from delivering static files as URLs to creating full blown applications, Web servers became Web application development frameworks.

As the need for more sophisticated features has grown, so too have the capabilities of the Web servers used to implement them. However, they are still based on the original one file per request architecture that was seemingly previously advantageous, but now burdensome. To support these added capabilities, the size and complexity of the APIs has grown. The descendants of the CGI architecture are stressed to provide functionality that isn't a good fit for their designs. As an example, a recent Servlet API (2.0) needs over two dozen classes and almost ten times that many methods to describe its interface.

The entire reason for the explosion of interface complexity isn't completely due to the complexity of the interactions required by implementors of the interface. As Web servers have become Web application frameworks, the notion that the same set of content can be delivered by any server has persisted. Somehow the "content" is viewed as separable from the server used to deliver it. Consequently, every new Web server designer feels obliged to incorporate every nuance and capability of every previously deployed server, to insure that pre-existing content can be delivered with the new software without change.

As the Web matures, a transition is occurring away from the current client-server paradigm, where browsers are pointed at particular Web sites, whose servers deliver all the content on that site, to a more distributed model. In this new model, both the traditional browsers and servers will still exist, but the content received by the client for a particular page is likely to have been retrieved from several traditional back-end servers, and modified to suit the requirements and desires of the particular client. This is a "work flow" model, where the content passes through various stages, and is transformed at each stage.

Early versions of these intermediate stages, termed meta-servers, are already starting to appear on the Web. Some of the meta-servers are called "portals", and others are known as "content aggregators". For the most part, portals and content aggregators are one in the same. It is a portal when viewed from the perspective of the client, and a content aggregator from the perspective of the traditional, or "content", server.

As these meta-servers begin to play a more prominent role in the infrastructure, they will have a profound impact on the way in which traditional content servers are constructed. No longer will the content server produce both the content and its presentation (look and feel). Meta-servers will transform the content after it leaves the content server, allowing content servers to be simpler. Today's content servers not only provide the content, but manage the presentation, user preferences, and browser differences as well.

BRIEF SUMMARY OF THE INVENTION

A system and method for providing an extensible application Web framework is presented which includes a server object, a request object, at least one handler object, and a properties object. The server object is adapted to store information relevant to a Web application and create and call the request object to obtain the request. A handler object is called to respond to the request. The properties object contains information which may be used by one or more handlers, the server object, and the request object. The request object never uses the properties object other than to store a reference to it.

In one aspect of the invention, the server object is adapted to call the initialization method of the handler object associated with a handler name. In another aspect of the invention the handler object is adapted to instantiate additional handler objects to create extensible functionality. In another aspect, the handler object is adapted to alter the properties object such that later called handler objects may act on modified information.

In another aspect the request object is adapted to obtain and parse server requests. The request object contains information related to a server request that is used to create the response to the request.

In another aspect of the invention, a method of operating a Web application creates a server object with a properties object. A handler object is created by the server object. The server object then calls an initialization method of the handler object and then waits for a request, such as an HTTP request. Upon receiving an indication of a request, the server object creates a request object. The server then calls methods in the request object to obtain the request at the incoming port. The server object then calls the respond method of the handler object and passes it the request object. In another aspect of the invention, the respond method of the handler object calls a respond method of a second handler.

BRIEF DESCRIPTION OF THE DRAWINGS

The accompanying drawings, which are incorporated in and constitute a part of this specification, illustrate at least one embodiment of the invention and, together with the description, serve to explain the principles and advantages of the invention.

In the drawings.

DETAILED DESCRIPTION OF THE INVENTION

Figure 1:
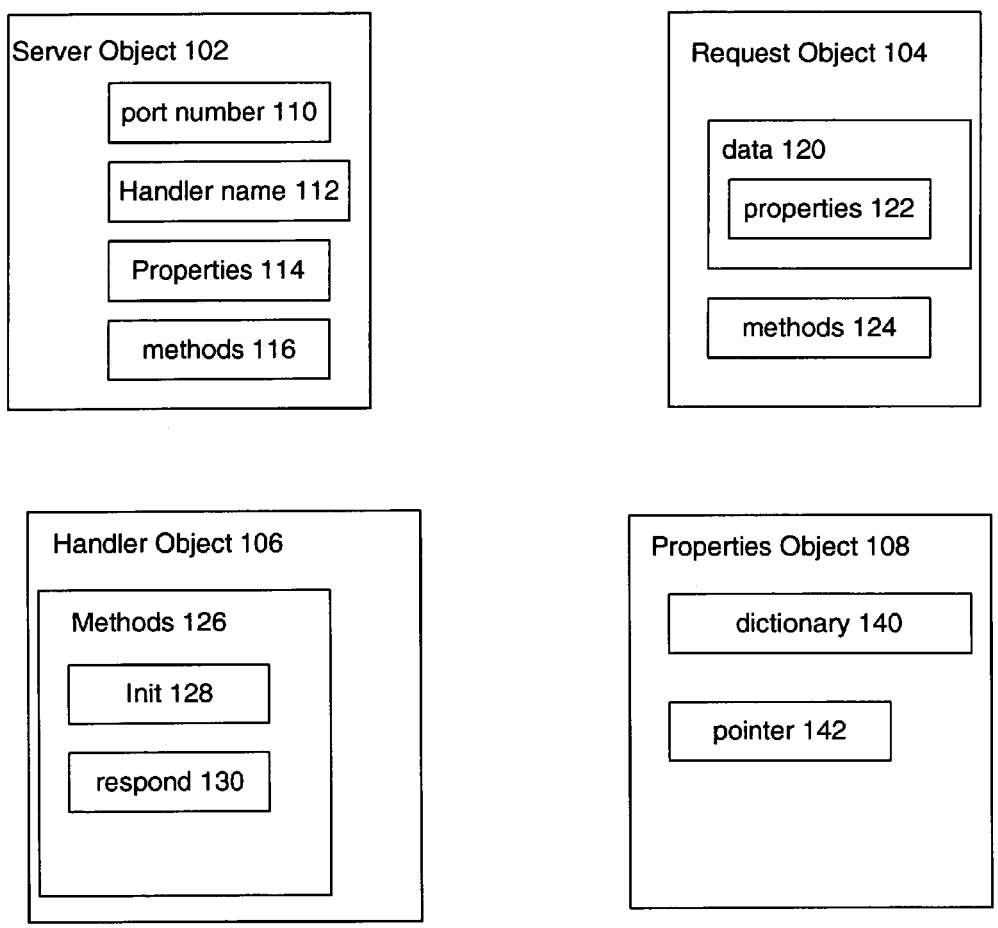
FIG. 1 is an illustration of the major components of a Web application development framework according to the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments illustrated, but is to be accorded the widest possible scope consistent with the principles.

Reference will now be made in detail to implementations consistent with the principles of the present invention as illustrated in the accompanying drawings. Wherever possible, the same reference numbers will be used throughout the drawings and the following description to refer to the same or like parts.

The invention seeks to support the future of the Web so that content servers can be simpler, providing just the content. The integration with other content, as well as the shaping of the look and feel for a particular browser will be added in stages by various meta-servers as the content flows toward the ultimate consumer.

Many types of content that are not traditionally located on a Web server will become available. This new content, not able to stand on its own in the traditional Web world, will be consumed by meta-servers which will integrate the content with information from other content and meta servers. Devices, sensors, and actuators will be accessible over the Web, and will have their information integrated into the Web fabric created by the network of content servers, devices, and meta-servers.

Consistent with the principles of the present invention an architecture for building Web applications is disclosed that is simple, modular and scalable. Different from the prior art of clients talking to content servers, the present invention describes a network of portals and content aggregators interposed between the providers and consumers to create a personalized Web of customized content, dynamically synthesized by integrating information from a wide range of sources.

The invention provides a new architecture and sample implementations for building both content-servers and meta-servers. In the content server context it permits the attachment of simple devices to the Web with the barest of capabilities, squeezing into the tiniest places—a micro server. In the meta-server context, it provides rich and flexible mechanisms for synthesizing, transforming, and integrating content; content retrieved both from traditional content servers as well as the new breed of micro servers. Finally, the invention provides capabilities to integrate with traditional N-tier applications, providing a bridge between the current client-server Web into the future.

To achieve this two part goal, a two part strategy is taken. The existing notion of mapping URLs to UNIX-based files is abandoned. Modern URLs are too fluid to have a fixed binding to underlying files. Indeed, many small devices have no notion of file systems at all. Specific mechanisms used to implement existing content server capabilities are discarded. For example, most traditional content servers use .htaccess files to provide password protection for content. The file based nature of the .htaccess mechanism is less desirable, so direct support is not built-in. Password protected URLs are still available, albeit via a different mechanism.

The second part of the strategy is based on defining a series of abstract capabilities that support the entire range of applications, from the tiniest micro-server to a more traditional content-server to a sophisticated meta-server. This provides an architecture that starts with a small core and a simple interface for adding functionality required of a micro-server implementation, and adds to it a set of composable, interchangeable modules that can operate together in a scalable way.

With modules for manipulating traditional file-based content, the traditional content server capability can be obtained. By adding modules that can string together arbitrary relationships between users and pages, and combining them with modules that can obtain and manipulate foreign content, sophisticated meta-servers are possible.

The invention features a simple extension application programming interface (API) called a handler using a delegation based object model. It provides dynamic loading of application functionality and configurations. The handlers that provide application functionality are resolved and loaded at run time. Mechanisms are provided for composing application modules, encouraging code reuse and design orthogonality. Information specific to an entire application is gathered in one place, and made available to all of the handlers, simplifying server modification and configuration.

Four key components of the Web application development framework are illustrated in FIG. 1 and the interrelationships between them define the invention architecture. Referring to FIG. 1, the Web application development framework provides a Server object 102, a request object 104, a Handler object 106, and a Properties object 108 to create a Web application.

The Server object 102 represents the particular server in operation. The Handler object 106 is the mechanism by which functionality is added to the Web application. The Properties object 108 is the data structure for managing the information flow between the other components of the Web application. The Request object 104 is used to parse an initial request.

As content management capabilities are shifted from traditional Web servers to meta-servers, the traditional Web server can focus entirely on the content it needs to deliver. At the extreme, it becomes a micro-server, delivering domain specific content in a bare bones way. These smaller, simpler servers can now be attached to sources of content that previously would be considered too small or unimportant to justify their own Web servers. Examples include a digital thermometer whose content consists of the temperature of something, or a light switch, whose content is either on or off. Although a Web server whose content consists entirely of "on" or "off" may not, by itself, be especially important, when used in conjunction with meta-servers that can aggregate content from this and hundreds or millions of other similar servers, the content suddenly becomes very interesting.

The term UPI, which stands for URL Programming Interface, is used to discuss the capabilities if these micro-servers. A UPI is just like an API, or Application Programming Interface, traditionally described in terms of specific programming language bindings, only UPIs are described in terms of URLs. Taken in this light, a URL no longer represents a file, instead it represents a set of programmable interfaces or remote procedure calls that happen to be accessible via HTTP.

Using the invention as a micro-server becomes defining a UPI for the desired functionality, using a built-in HTTP protocol stack as a transform mechanism, and writing the code to implement the UPI.

The Server object 102 is generally the simplest of the four components and represents information and methods relevant for the life of the particular server. The Server object 102 may include include a port number 110, a Handler name 112, Properties object 114, and variables and methods 116.

The port number 110 stores the port on which the particular server is started and is usually supplied upon startup. The Handler name 112 is the name or a reference to the initial Handler object 106 that the Server object 102 calls. It may be supplied upon startup or set to call a default as the case may be. The Properties object 114 contains information relating to the operation of the Web application as well as a dictionary which may be used by any Handler object 106. The Properties object 114 may be implemented as a hash table and is an instance of Properties object 108. Properties object 114 may contain some information that exists for the life of the server and information that may be altered during the life of the Server object 102. In essence, Properties 114 acts as a Web application blackboard for the various Handlers 106 that may be called. A Web application may have one or more active Server objects 102, which usually operate independently. Other variables that could be stored include, but are not limited to, a count of accepted connections, a default buffer size for copies to and from client sockets, a count of errors, the name by which the Web application should identify itself in an HTTP redirect, various logging information, a string to return for the "server" line in an HTTP response header, the protocol used to access the Web application, such as HTTP or HTTPS, for example, a request count of all requests to date, and a timeout value for closing an idle socket.

The Server object 102 also contains methods 116. These method provide various functions necessary for the Web application. Typical method include, but are not limited to, a method for converting an HTTP port into the URL string fragment used to access it, a method for logging, and a method for accepting socket connections.

Request object 104 obtains and turns a request into information usable by any subsequent Handler objects 106 to satisfy an HTTP request. Generally, Request object 104 represents an HTTP transaction. It provides a set of accessor functions to obtain the individual fields of the HTTP header. It also provides utility methods that are generically useful for manipulating HTTP requests. Instances of this object are created automatically by the Server object 102, and then passed as references to the Handler objects 106. There will be exactly one Request object 104 per thread request at any time.

The Request object 104 contains data 120, including a Properties object 122, and methods 124. The data 120 may include variables that the Request object 104 uses to store relevant information about a particular request. The relevant information may include, for example, fields to indicate what protocol is being used by the requester, fields to interact with the server port, references of information to send to the port, form data information, properties 122, a query string, and incoming and outgoing header information. While the invention is described for HTTP, any other protocol may also be used.

Initially Properties object 122 (an instantiation of Properties object 108) is initially empty except for a pointer back to the Properties object 114 in Server object 102. The Request object 104 provides this functionality as a useful tool for Handler objects 106 that wish to communicate to subsequently called Handler objects 106 or to modify a server property for a particular request. Methods 124 provide the required functionality to read input and write output to the Web application's port such as a send-response and a send-error. It can also provide methods for modifying the response headers and return codes.

The Handler object 106 provides the interface that defines how HTTP requests get mapped into content. It may include a methods portion 126. Method portion 126 contains an Init method 128 that provides initialization services and a Respond method 130. The Handler object provides basic functionality to accept requests such as GET, HEAD, and POST. The Init method 128 is called before the Respond method 130 processes the first HTTP request, to manage allocating any resources needed for the lifetime of the handler. The Respond method 130 and all methods it calls should be thread-safe since they may handle HTTP requests from multiple sockets concurrently, although there will be exactly one Request object 104 for each thread.

The Handler object 106 may be passed a server name which is the HTTP server that created the Handler object 106. Typical Handler objects 106 will use Properties 114 of Server object 102 to obtain run time configuration information.

The Handler object 106 may also be passed a prefix name which is a prefix to prepend to all of the keys that this handler uses to extract configuration information out of Properties 114 of Server object 102. This may be set by aChainHandler (described later) to avoid configuration parameter name space collisions. For example, if a Handler object 106 is looking for a property MyProperty, and the prefix is "handler.", then that configuration option will be found in Properties 114 of Server object 102 in the key "handler.MyProperty".

The Respond method 130 responds to the HTTP request and returns True if the request was handled. A request was handled if a response was supplied to the client, typically by using a send-response or a send-error method of the Request object 104.

The Properties object 108 contains information used by the various components of the Web application. Properties object 108 includes a set of names and their associated values 140 and may contain a pointer 142. The name and value pairs could be implemented as a hash table or dictionary. This type of design is a delegation based model with a flat name space. Users of the invention to develop web applications are expected to make extensive use of collections such as those of the Java programming environment, however, other collections that provide the same features are contemplated. This technique allows developers to avoid having to deal with method explosion often seen in object oriented languages.

The invention architecture trades complexity in method signatures for a Properties object 108 that can contain an unlimited number of attribute/value pairs or key/value pairs depending on your terminology preference. The invention architecture relies heavily on this classical "data dictionary" which contains values available to handlers. Although there is a performance penalty for using this type of approach the benefits of not having global variables, and the ability to augment the object store seen by all handlers using key/value pairs far outweighs the performance reduction. Other approaches could easily provide 100 different methods for extracting the request information. Consider the case of a class with ten field members, classical techniques require 10 getters and setters to access the values. The present architecture stores these values in what their final form will usually be anyway, programmers can use the same two methods over and over; property.get( ) and property.set( ).

The properties approach requires that you only know the names of the properties. Another difficulty with methods to access each field approach is the possibility that you will not provide the methods a user needs so developers end up converting them anyway. For example, take into account the signature of a method/function. The Request object could easily be given 100 methods for users. The present invention does not do do this, instead in the present invention when requests arrive they are put into a property collection and programmers can rely on one or two methods to get and set properties.

Automatic methods can then be used to generate required bean components. When a request arrives from a user all of the parameters for the request are stored as strings in a Request Object as attribute value pairs.

There are many applications where having a database is not appropriate for a web application due to complexity and maintenance costs. The present invention allows simple object stores to be built, that can be easily accessed by users using a very simple language called the Brazil Scripting Language. This language allows any web developer to interact with a Web accessible data dictionary with minimal programming knowledge and effort.

Figure 2:
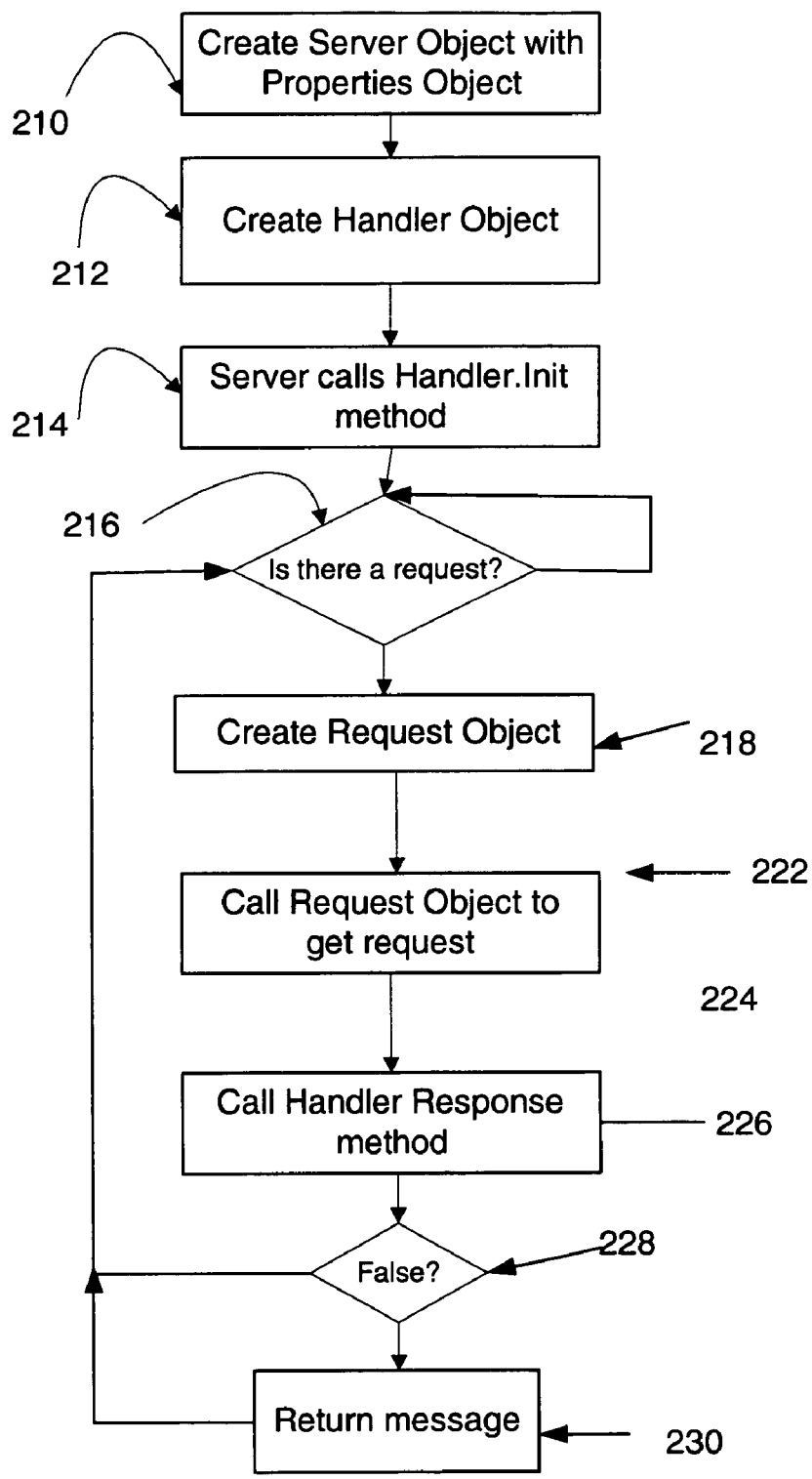
FIG. 2 is a flow chart describing the operation of a server according to the present invention.

The method of operating Sever object 102 is illustrated in FIG. 2. As the Server object 102 starts, it is passed a Properties object 108 that becomes initial Properties object 114 (step 210). The Server object 102 then creates an instance of the Handler object 106 identified in Handler name 112 (step 212) and then calls the Init method 128 of the Handler object 106 while passing to the Init method 128 a reference to the Server object 102 (step 214) and a name that the handler may use to distinguish from the set of names in the properties object those which are intended for its use.

The Server object 102 waits until a request is received (step 216). When a request arrives, the Server object 102 creates a Request object 104 (step 218). In one embodiment, the Server object 102 can call multiple Request objects 104 according to a multi-threaded environment. The Request object 104 contains all of the information that pertains to client's URL request as well as methods that encapsulate the HTTP protocol. In another embodiment, because the Request object 104 is the object having the protocol implementations, the Server object 102 and Handler objects 106 do not need to be aware of the particular protocol being implemented.

After the Request object 104 is created in step 218, the Server object 102 calls the Request object 104 to obtain the request (step 220). The Request object 104 obtains and parses the HTTP request placing appropriate information in data portion 120. Finally, the Handler object 106 is called to produce the content (step 226).

Each time a Request object 104 is created, in response to an HTTP request, the Respond method 130 of Handler object 106 is called, and supplied the Request object 104 as a reference. The Handler object 106 examines the request, and by using the methods in the Request object 104, information in the data portion 120, and/or any other Properties object 108 linked via Properties 122, formulates an HTTP response. Once the request has been satisfied, the Request object 104 is discarded. Alternatively, methods may be provided to save the memory references to the Request object 104 so that it may be reused.

If a True is returned by Handler object 106 (step 228), then the Server object 102 returns to waiting for the next request (step 216). If an False was returned, then the Server object returns an appropriate error message (step 230) and returns to step 216.

If any parameters are required to configure the Handler object 106, they are placed in the Properties 114 object when the Server object 102 is started. The Handler object 106 can find its configuration information either in the Server object 102 as passed to the Init method 128, and/or in the Request object 104 provided with each request.

The setup described so far is desirable for micro-server applications. The Server object 102 and Request object 104 provide the framework for encapsulating and managing HTTP requests, and the Handler object 106 maps the requests onto device specific functionality. There is little unused infrastructure, and implementations can be made quite small. Configuration information required by the Handler object 106 is provided to the Server object 102 at startup time, and passed to the Handler object 106 when its method are called. This feature allows the initiator of the server to have great flexibility to creating servers with different extensible properties.

The creation of meta-servers, that operate both as portals and content aggregators, use the same development framework, and the identical interfaces as the micro-server. However, instead of building a system from a single handler that would need to be modified or rewritten for each new meta-server application, the meta-server is constructed as a cooperating collection of Handler objects 106 classes, whose arrangement and configuration can be modified to provide a wide range of capabilities.

Because the Handler object 106 interface is so small, it is easy to create a Handler object 106 that functions both as a consumer to the Request object 104, as in the micro-server example above, and as a provider of the Request object 106. This insight lets us create a Handler object 106 that calls other Handler objects 106, permitting multiple Handler objects 106 to participate in the processing of each HTTP request. By combining these "interior node" Handler objects 106 with the simple, or "leaf" Handler objects 106, a directed graph of Handler objects 106 can be created. This permits the construction of meta-servers by combining small bits of reusable functionality together.

Figure 3:
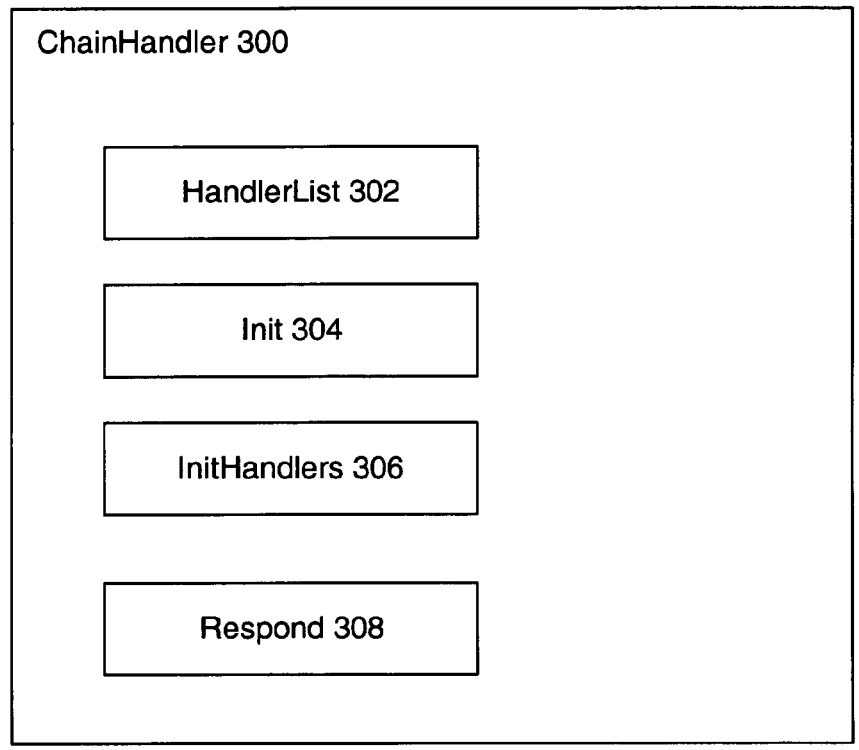
FIG. 3 is an illustration of an exemplary ChainHandler according to the present invention.

A simple yet powerful use of "interior node" Handler object 106 can be illustrated by the ChainHandler, a type of Handler object 106, which chains together a list of other Handler objects (possibly including other ChainHandler objects), forming the basic mechanism for creating graphs of Handler objects 106. ChainHandler 300, illustrated in FIG. 3, allows multiple Handler objects 106 to be invoked sequentially for a single HTTP request. When an HTTP request is received by the ChainHandler object 300, each of the Handler objects 106 is called in turn until one of them returns true. One useful feature of this type arrangement is that some of the called Handler objects 106 can modify the Request object 104 and then return false so that the next Handler object 106 will be able to process the modified Request Object 106. The ChainHandler 300 includes a Handler list 302, an Init method 304, an InitHandler method 306, and a Respond method 308. When the Init method 304 is invoked, the ChainHandler object 300 obtains the Handler list provided in the Server object Properties 114, calls the respective Init methods 128 of each using initHandler method 306. The Respond method 308 calls each Respond method 130 of the Handler list 302 in order until one of them return true.

Another interesting type of Handler object 106 is a FileHandler object which may provide functionality to obtain static files. The Response method of the FileHandler object converts a URL to a file, a file suffix to mime type lookup, delivery of "index" files when provided directory references, and redirection for missing slashes "/" at the end of directory requests. The FileHandler object may include root variable containing the document root property that it obtained from the Properties object 108. This feature can be used to modify a root directory during a particular request.

Another interesting Handler object 106 that could be created is an Interface Handler. This Handler object 106 provides basic functionality to accept HTTP requests and dispatch methods to handle the request.

As indicated above, the data used to configure any Handler object 106 is placed into the Properties object 104 as a set of name/value pairs when the Server object 102 is started. As long as there is only one Handler object 106, this scheme works fine. However, when multiple Handler objects 106 are used in the same Server object 102, configuration collisions can result either from different Handler objects 106 choosing the same name for a configuration parameter, or the same Handler object 106 instantiated multiple times with different configurations.

One way to overcome this limitation, provides for identifying particular properties in the Properties object 108 by the Handler object 106 that created them. Each "interior node" Handler object 106 is responsible for creating a set of Handler objects 106 that use it as the containing side of the Handler object 106 interface. When each of the Handler objects 106 is created, it is assigned a name which it prepends to its configuration parameter names when seen in the server properties, thus avoiding any possibility of name collisions.

For a Handler object 106 used in the micro-server implementation, any request that is not dealt with explicitly results in the Server object 102 sending the requester an HTTP Not Found response. In the meta-server case, where multiple Handler objects 106 have the opportunity to examine and respond to an HTTP request, a Handler object 106 may alter the state of the current HTTP request without providing content to the requester. This alteration can take the form of modifying the configuration parameters of other Handler objects 106, by changing the appropriate values in the Properties object 122 in Request object 104.

The Properties object 122 of Request object 104 may implemented as a stack, enabling Handler objects 106 typically retrieve their configuration properties from the top of the stack, the duration over which a Handler object 106's configuration is altered is controllable by manipulating the Properties object 122 stack. In the common case, changes one Handler object 106 makes to another Handler object 106's properties will only be in effect for the duration of the current HTTP request. Other ways will be obvious to those of skill in the art.

The following provides an illustrative embodiment of the invention as applied to creating a simple meta-server. A common feature of many Web servers is to allow users on a timesharing system to have their own private directory of files that are delivered as URLs. URLs that begin with "/~joe" would be delivered from joe's private directory of files instead of the main server directory. While most servers have this special capability built-in, the same effect is easy to provide with the present invention by a pair of Handler objects 106 that cooperate with each other. A FileHandler object is used to convert URLs into file names, and deliver the content of the files to the client. It is configured with a document root, the directory in the file system that acts as the root of the URL space.

To manage user's files, another Handler object 106 is run before the FileHandler object. If the URL starts with "/~" this Handler object 106 modifies the Request object by changing the URL to remove the user name portion, and setting the FileHandler object's document root parameter in the Properties object 122 Request object 104 to the proper user's home directory.

When the FileHandler object receives the HTTP request, it delivers the proper file from the user's directory, based on the new configuration parameters placed in the Properties object 22 Request object 104. When the next request comes in, the new configuration information will have been popped from the properties stack, and be unaffected by the previous modification. The same file handling scheme is reused in a different context.

Additional Handler objects 106 would be desirable for implementing a more fully featured meta-server, each performing a different task, but working together to create a powerful content manipulation environment. The following discusses exemplary additional Handler objects 106 and how they work together to create robust meta-servers environment.

A first class of Handler objects 106, of which the FileHandler object described above is an example, can be used together to provide the functionality of a traditional Web server, including delivering files, running CGI scripts, providing password protected pages, and interfacing to other, non HTTP protocols such as LDAP (Lightweight Directory Access Protocol) or JDBC (Java Database Connectivity).

A next class of Handler objects 106 performs content aggregation capability desired by a meta-server. These Handlers object act as HTTP clients and retrieve content from a different server. The core of this capability could be a fast proxy that implements the client side of the HTTP protocol. A ProxyHandler object would cause entire Web sites to appear as if the content was stored locally in files. As each URL is retrieved from a content server, the contents are examined, and every URL that points back to the content server is rewritten so as to appear locally. When used in conjunction with the FileHandler object, the ProxyHandler object provides the illusion of a single file system, where arbitrary sub-directories are actually retrieved dynamically from other servers. This capability, called "Web mount" provides an analogous set of semantics as the "file system mount" facility does for ordinary files in UNIX-based OSs.

Another content aggregation Handler object could is designed for use with micro-servers, whose simple presentation-free content needs to be integrated with additional data in order to be presented to the user in a meaningful way. Content retrieved from this Handler object 106 is converted into a set of name/value pairs and placed into the Properties object 122 of Request object 104 for further processing. The property values are used by other handlers in formulating the final response.

An interesting variation on the use of the Handler object 106 is to create the ability to provide micro-servers that dynamically effect the operation of the main server by returning values that represent configuration parameters of one or more Handler objects.

A third category of Handler objects 106 may be used to manipulate content once it has been obtained. These Handler objects 106 might come in two flavors, content extraction and content integration. The content extraction Handler objects 106 use the HTML and XML (eXtensible Markup Language) processing capabilities provided by the invention to analyze and decompose content, and convert it into name/value pairs that are stored in the Request object 122 of Properties object 104. The source of the content may be obtained locally, from a file, or remotely from a remote content server.

The content integration Handler objects 106 also use the HTML and XML processing capabilities, but this time to insert the previously extracted content into XML templates for final delivery to the requester.

The Properties object 122 of Request object 104 is used as the rendezvous location, not only to characterize both the HTTP request and the server configuration, but to hold extracted content as well. Handler objects 106 can access and manipulate all three kinds of data in a uniform manner.

A final category of Handler objects 106 may be used to manipulate the temporal scope of the request data, by providing persistent session state. This makes it easy, in portal configurations, to maintain user preference information.

By using a simple interface, in conjunction with powerful, reusable components, the invention is able to deliver a wide range of flexible Web solutions, ranging from tiny micro-servers, to traditional Web capabilities to fully functional meta-servers that provide sophisticated portal and content aggregation capabilities.

The following presents an exemplary meta-server created by using the Web application framework that illustrates the extensibility and power of the Web application framework. It consists of a Server object 102, a series of Handler objects 106, a Request object 104, and a Properties object 108. The functionality is obtained in the manner that the Handler objects 106 act on the information upon receiving a request. This sample meta-server can obtain and modify "foreign" content on a per-user basis. The Server object 102 is created with a Hander object 106 to run, and a Properties object 108. The Properties object 108 is used by the Handler object 106 (and any sub-Handler objects 106) for configuration information.

The Handler object 106 started by the Server object 102 is the ChainHandler 300, whose function is to permit multiple handlers to participate in generating the response for a client request.

Figure 4:
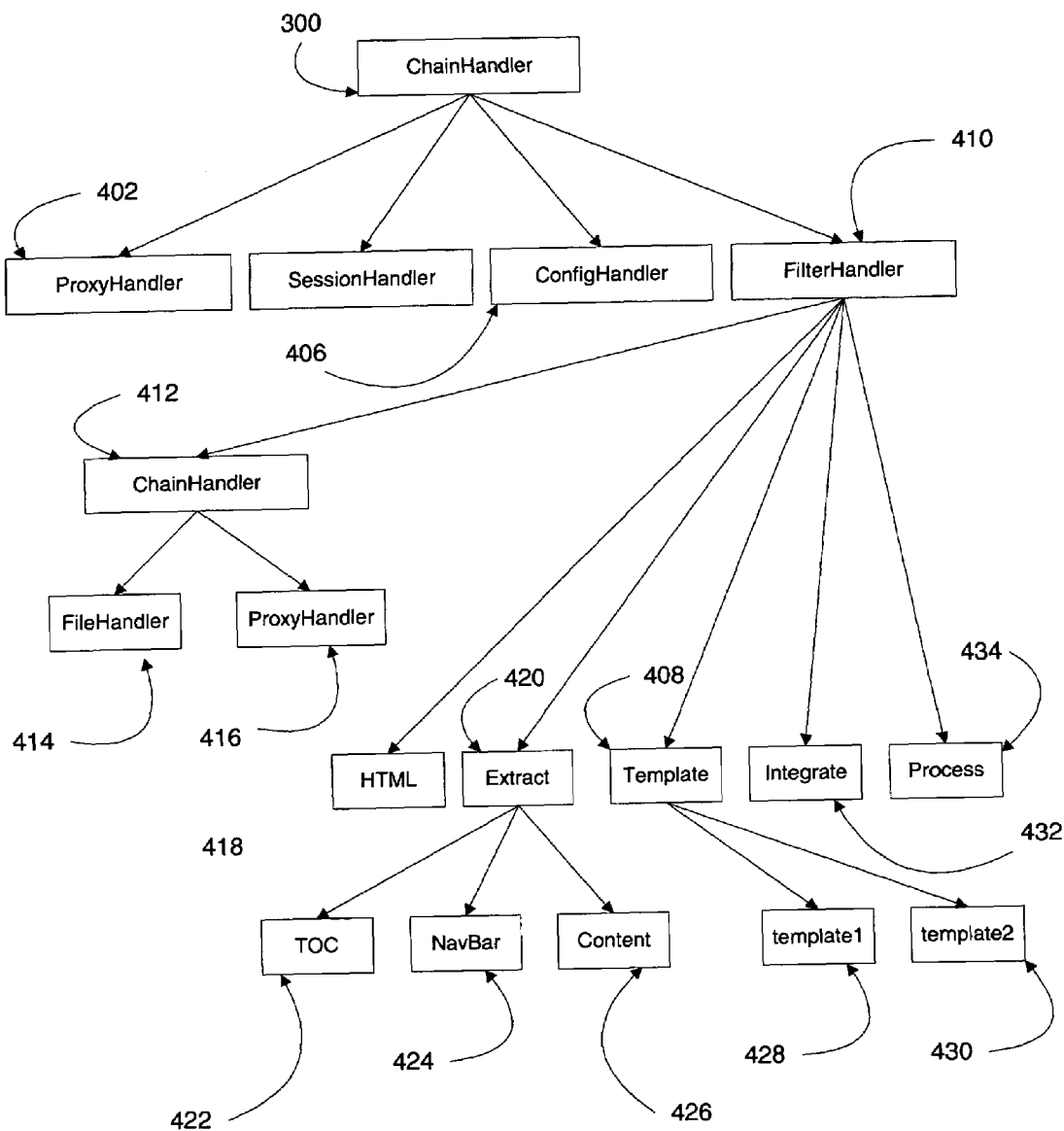
FIG. 4 is an illustration of the tree structure for an exemplary meta-sever using the present invention.

FIG. 4 illustrates the general configuration of the Handler object hierarchy for a meta-server and will be described in the manner of the operation of the meta-server. The Server object 102 invokes the Init method 304 of the ChainHandler 300. The Init method 304 creates all of the chained Handler objects 106, acting as sub-handlers, and calls their Init methods. After the Server object 102 has created the ChainHandler 300, it waits for a request. When the request is received, the Server object 102 creates a Request object 108, calls the Request object to get the request and then passes the Request object 108 to the ChainHandler 300. The ChainHandler 300 calls the method of the sub-handlers until True is returned from a handler.

The first sub-handler is a ProxyHandler 402 and serves only to provide initial configuration information to the Server object 102 by modifying the Server's behavior in a site specific way. For example, in some Intranet configurations, a site specific mechanism is required to create a connection to an external site, given the name of the site. The ProxyHandler 402 may contain the site specific information required to create the connection from the URL. It responds "False" to all requests. Accordingly, the ChainHandler 300 will then call the next Handler object 106.

The SessionHandler 404 is called after the ProxyHandler 402 next. It examines the client request to determine the specific user, or session the request is associated with, sets a value in the properties, then returns false, allowing the request to pass to the next handler.

The next handler, the ConfigHandler 406 looks up the session id, set by the SessionHandler 404, and retrieves a set of name/value pairs associated with that user. The values of the set of variables may (potentially) be modified by the user (during a prior or subsequent request). One of the variable names will be used later on by the TemplateHandler 408 to select the look-and-feel template.

The FilterHandler 410 is called next by the ChainHandler 300. It performs two steps. First, it calls a handler (the wrapped handler) to obtain the content that represents the response to the request, then it passes that content to one or more filters, each of which may choose to modify the content. Once all of the filters have had the opportunity to modify the content, the filter handler sends it back to the requestor, by calling the appropriate methods in the request object, and returns "True" indicating the request has been satisfied.

For the handler wrapped by the FilterHandler 410, we use another instance of a ChainHandler, ChainHandler 412, allowing multiple sub-handlers to be used generate content for the request. The first one, FileHandler 414 translates the URL from the request into a file name, and if it exists, returns "true", using the content of the file as the response destined for the requester. If the file does not exist, the file handler returns "False", effectively passing the request onto the ProxyHandler 416.

ProxyHandler 416, acts as an HTTP client and makes an HTTP request to a different Web server on the Internet, translating the originating request as appropriate. When the response comes back from the different server, which may be by a proxy, the content is examined, and modified (as needed) to make it appear to the requester, here ChainHandler 412 to have originated at the meta-sever site.

At this point, the FilterHandler 410 has content representing the response to the request, either from the FileHandler 141 or the ProxyHandler 416. That content is passed to the subsequent filters sequentially, allowing each of them to modify the content.

The HTMLifyer filter 418 only modifies the content if its mime type is text/plain, transforming it into type text/html. This allows the subsequent filters, that only operate on text/html files to also work on (what was) plain text.

The Extract filter 420 uses one or more templates to modify HTML content. Each template defines one or more methods that match HTML or XML entities in the content. The content is scanned as html/xml, and the methods corresponding to the html/xml entities defined by the union of the templates are called, so they may modify portions of the content based on its html/xml structure.

In this example three separate template classes define a dozen methods in total that are called by the Extract filter 420 to modify the content. The TOC filter 422 looks for headings present in the content, and creates name/value pairs in the properties that represent the text and position of the headings in the document. In addition, the contents may be modified, placing anchors onto the document that correspond to the values placed into the Properties object 108.

The NavBar template 424 examines the URL associated with the content, and creates name/value pairs in the Properties object 108 that may be used by other templates (or filters or handlers) to generate the HTML that represents a navigation bar. The Content template 426 decomposes the content into a set of name/value pairs, which it places into the properties. This set of name/value pairs contains the same text as the original content, only categorized semantically.

The content is then passed by the FilterHandler 410 to the next filter, the Template filter 408. The Template filter 408 completely discards the content (the content has already been categorized and placed into the Properties object 108). FilterHandler 410 then looks in the Properties object 108 to find the name of a look and feel template file, and uses the contents of the template file as the current content. FIG. 4 illustrates template 428 and template 430.

The FilterHandler 410 takes content, which is now the contents of the template file, and passes it to the next filter, the Integrate filter 432. Like the Extract filter 420, the Integrate filter 432 uses a set of html/xml templates to process the content. In this case, the Integrate filter 432 takes the original content that has been stored in the Request object Properties object of the FilterHandler 410 by the Extract filter 420, and substitutes it into the content that was created by the Template filter 408. The resultant content is a combination of the original content with the look and feel template.

The final filter, the Process filter 430, allows one or more templates to process the html/xml, performing XML to HTML conversion in a manner which is consistent with the ultimate consumer of the content.

Now that the content is completely filtered, the FilterHandler 410 arranges for it to be delivered to the requestor by invoking the appropriate methods in the request object, then returns True.

Given this Web application development framework, many more applications can be created. The simplicity in the design lies in the fact that the same principles used to design a small server as to design a full functional Web application. The Web application framework of the present invention reduces the need to have one server application that must include numerous functions, some hardly ever used and some not necessary.

Figure 5:
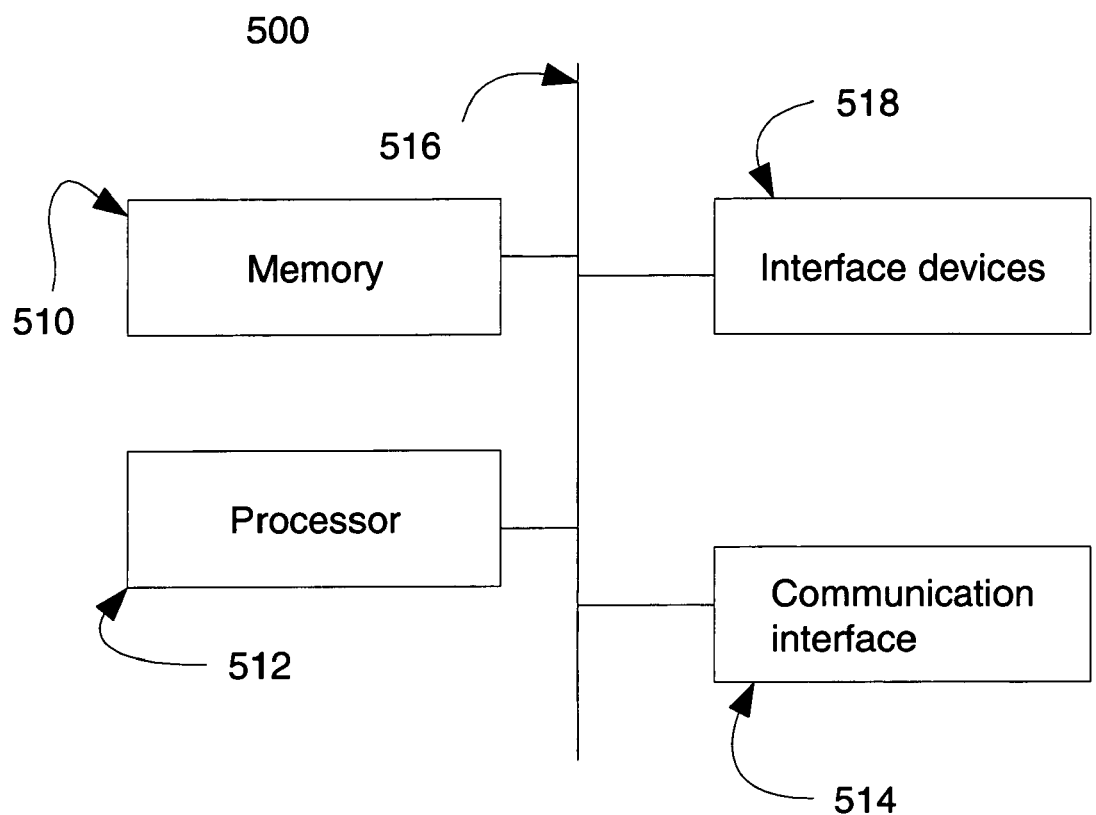
FIG. 5 is in illustration of a general purpose device for implementing the present invention.

FIG. 5 illustrates one such system 500 for implementing the invention. System 500 includes a memory 55, a processor 512, a bus 514, a communication interface 516, and interface devices 518. Processor 512 may include any type of computational engine for executing programs within system 500. This includes, but is not limited to, a microprocessor, a device controller, and a computational device within an appliance. Memory 55 may include any type of random access memory for storing code and data for use by processor 512. System 500 may also include secondary storage device 522 which may include any type of nonvolatile storage device for storing code and data for use by processor 512 like magnetic storage devices, such as disk drives, and electronic storage devices such as a flash memory or battery backed up random access memory.

Communication interface 516 may include any type of mechanism for communicating between computer system 500 and any other node. This may include any type of communication medium including, but not limited to, electrical, optical. Infrared or radio signal communication pathway.

Interface devices 518 are any types of devices used to allow a user to interact with system 500. This may include, for example, displays, keyboards, computer mice, touch sensitive displays, audio devices, or any other device that allows users to interact with system 500.

These components are described in the context of the prototype implementation, written in the JAVA™ programming language for simplicity. However, any language could be used to implement the invention.

While the preferred embodiments of the present invention have been illustrated herein in detail, it should be apparent that modifications and adaptations to those embodiments may occur to those skilled in the art without departing from the scope of the present invention as set forth in the following claims.

What is claimed is:

1. A method for processing a request from a web application comprising:

receiving the request by a server object;

generating a request object to manage processing of the request;

forwarding the request to a handler object by a request handler;

processing the request using the handler object, wherein processing the request using the handler object comprises sequentially invoking a first interior node handler object configured to process a portion of the request to generate a first partial result, and invoking a second interior node handler object configured to generate at least one selected from the group consisting of a second partial result and a result using the first partial result, wherein the second partial result is used to generate the result; and storing the first and second partial result in a properties object, wherein name collisions are avoided when the first interior node handler object modifies a name of the first partial result to associate the first partial result with said first interior node handler object and the second interior node handler object modifies a name of the second partial result to associate the second partial result with said second interior node handler object.

2. The method of claim 1, wherein the properties object is further configured to provide information to the server object, wherein the server object is configured to initialize the request object and the handler object.

3. The method of claim 1, further comprising:

calling a response method of a second handler object in formulating the response.

4. The method of claim 1, wherein the handler object obtains content from a server, and wherein the handler object extracts relevant information from the content, and reformats the content according to a template.

5. The method of claim 1, wherein the handler object is called on to respond to a request embodied in the request object.

6. The method of claim 1, wherein the first and the second interior node handler object exchange information via the properties object.

7. The method of claim 1, wherein the first interior node handler object and the second interior node handle object are configured to modify the properties object and respond to the request based on the properties object.

8. The method of claim 1, further comprising:

formulating a response to the request.

9. The method of claim 1, wherein the first interior node handler object comprises configuration information defining how the first interior node handler object modifies the name of the first partial result.

10. The method of claim 1, wherein the second interior node handler object comprises configuration information defining how the second interior node handler object modifies the name of the second partial result.

11. A framework stored on a computer readable medium with instructions for processing a request from a web application comprising:

a request object configured to manage processing of the request;

a handler object configured to perform the request using the request object by sequentially invoking a first interior node handler object configured to process a portion of the request to generate a first partial result, and invoking a second interior node handler object configured to generate at least one selected from the group consisting of a second partial result and a result using the first partial result, wherein the second partial result is used to generate the result; and a server object configured to receive the request and initialize the request object and the handler object; and a properties object configured to provide information to the server object to initialize the request object and the handler object, and configured to store the first and second partial result, wherein name collisions are avoided when the first interior node handler object modifies a name of the first partial result to associate the first partial result with said first interior node handler object and the second interior node handler object modifies a name of the second partial result to associate the second partial result with said second interior node handler object.

12. The framework of claim 11, wherein the server object is configured to call an initialization method of the handler object, wherein the handler object is associated with a handler object name.

13. The framework of claim 11, wherein the handler object is configured to instantiate a second handler object.

14. The framework of claim 11, wherein the handler object is configured to modify the properties object to obtain a modified request object.

15. The framework of claim 11, wherein the request object is configured to obtain and parse the request.

16. The framework of claim 11, wherein the request object comprises information related to the request.

17. The framework of claim 11, wherein the properties object comprises a name value pair.

* * * * *